US005692134A

United States Patent [19]

Wang et al.

[11] Patent Number: 5,692,134

[45] Date of Patent: Nov. 25, 1997

[54] PRESERVING CONFIGURATION INFORMATION IN A SCAM BASED SCSI SYSTEM

[75] Inventors: Yee-Peng Wang, Milpitas; Edward S. Chim, San Jose, both of Calif.

[73] Assignee: Adaptec, Inc., Milpitas, Calif.

[21] Appl. No.: 532,919

[22] Filed: Sep. 22, 1995

[51] Int. Cl.[6] .......... G06F 13/00

[52] U.S. Cl. .......... 395/284; 395/828; 395/882; 395/309; 395/421.06

[58] Field of Search .......... 395/284, 282, 395/283, 828, 829, 830, 831, 882, 888, 892, 309, 421.06, 420, 421.01, 421.02, 421.1

[56] References Cited

U.S. PATENT DOCUMENTS

| | | | |
|---|---|---|---|
| 4,998,069 | 3/1991 | Nguyen et al. | 324/539 |
| 5,175,822 | 12/1992 | Dixon et al. | 395/829 |
| 5,239,632 | 8/1993 | Larner | 395/306 |
| 5,274,783 | 12/1993 | House et al. | 395/281 |
| 5,317,693 | 5/1994 | Cuenod et al. | 395/829 |
| 5,428,748 | 6/1995 | Davidson et al. | 395/829 |
| 5,446,897 | 8/1995 | Mathias et al. | 395/200.01 |

OTHER PUBLICATIONS

Annex B of SCSI-3 Parallel Interface Draft ANSI Standard, Doc. No. X3T10/855D, Rev. 15a (1995).

"Data Communications, Computer Networks And Open Systems" by Fred Halsall, 3rd ed., pp. 106–113, (1992).

*Primary Examiner*—Jack B. Harvey
*Assistant Examiner*—Ario Etienne
*Attorney, Agent, or Firm*—T. Lester Wallace; Forrest E. Gunnison

[57] ABSTRACT

A peripheral coupled to a SCSI bus is isolated using a SCAM isolation step and the original SCSI identification bits (32 bytes) are read from the isolated peripheral into a host adapter. The host adapter then generates a relatively small number (for example, 4 bytes) of identification bits from the relatively large number of original SCSI identification bits. The small number of SCSI identification bits is stored in a non-volatile memory of the host adapter such that the memory location of the SCSI identification bits of a particular peripheral corresponds with the logical system identifier of that peripheral. Even if peripherals are removed from the bus and/or added to the bus, the small number of SCSI identification bits for a peripheral previously on the bus is redetermined and located in non-volatile memory of the host adapter so that the logical system identifier of the peripheral previously coupled to the bus is not changed.

22 Claims, 9 Drawing Sheets

| Function Code | Description |
|---|---|
| 00000b | Isolate and Assign SCSI ID |
| 00001b | Isolate and Set Priority Flag |
| 00010b | reserved |
| 00011b | Configuration Process Complete |
| 00100b to 01110b | reserved |
| 01111b | Dominant Initiator Contention |
| 10000b to 11110b | reserved |
| 11111b | Synchronization |

FIG. 5

SCSI Identification String

| Byte \ Bit | 7 | 6 | 5 | 4 | 3 | 2 | 1 | 0 |
|---|---|---|---|---|---|---|---|---|
| 0 | (MSB) | Type code | | | | | | |
| 1 | | | | | | | | (LSB) |
| 2 | (MSB) | Vendor identification | | | | | | |
| 9 | | | | | | | | (LSB) |
| 10 | (MSB) | Vendor Specific code | | | | | | |
| 30 | | (up to 21 bytes) | | | | | | (LSB) |

FIG. 6

Type Code

| Byte \ Bit | 7 | 6 | 5 | 4 | 3 | 2 | 1 | 0 |
|---|---|---|---|---|---|---|---|---|
| 0 | Priority Code | | Maximum ID Code | | Reserved | ID Valid | | SNA |
| 1 | Reserved | | | Requested SCSI ID | | | | |

FIG. 7

Transfer Cycle Conditions

| Bit Value | Asserted on DB(4-0) | Latched from DB(4-0) | Condition |
|---|---|---|---|
| 0 | 00001b | 00001b | Continue |
| | | 00011b | Defer |
| 1 | 00010b | 0001xb | Continue |
| none | 00000b | 000x1b | Defer |
| | | 0001xb | Defer |
| | | 00000b | Terminate |
| any | 000xxb | 100xxb | Terminate |
| | | any other value | Error |

FIG. 8

Action Codes

| First Quintet | Second Quintet | Description |
|---|---|---|
| 11000b | ccnnnb | Assign ID 00nnnb |
| 10001b | ccnnnb | Assign ID 01nnnb |
| 10010b | ccnnnb | Assign ID 10nnnb |
| 01011b | ccnnnb | Assign ID 11nnnb |
| 10100b | 11000b | Clear Priority Flag |
| | 10010b | Locate On |
| | 01011b | Locate Off |
| | others | Reserved |
| others | | Reserved |

FIG. 13A

| Incoming Bits From SCSI ID String Bytes 0-9 | Remainder Using 6A6Ah As Divisor | Incoming Bits From SCSI ID String Bytes 10-31 | Remainder Using 6A6Ah As Divisor | (continued from previous column) | |
|---|---|---|---|---|---|
| 1 | 0001h | 0 | 0000h | 0 | 7A5Eh |
| 0 | 0002h | 1 | 0001h | 0 | 521Ah |
| 1 | 0005h | 0 | 0002h | 1 | 0293h |
| 0 | 000Ah | 0 | 0004h | 1 | 0527h |
| 0 | 0014h | 1 | 0009h | 0 | 0A4Eh |
| 0 | 0028h | 1 | 0013h | 0 | 149Ch |
| 1 | 0051h | 0 | 0026h | 0 | 2938h |
| 1 | 00A3h | 0 | 004Ch | 1 | 5271h |
| 0 | 0146h | 0 | 0098h | 0 | 0244h |
| 0 | 028Ch | 1 | 0131h | 0 | 0488h |
| 0 | 0518h | 0 | 0262h | 1 | 0911h |
| 0 | 0A30h | 1 | 04C5h | 1 | 1223h |
| 0 | 1460h | 0 | 098Ah | 0 | 2446h |
| 0 | 28C0h | 0 | 1314h | 0 | 488Ch |
| 0 | 3BEAh | 0 | 2628h | 1 | 37BFh |
| 0 | 1DBEh | 0 | 4C50h | 1 | 6F7Fh |
| 0 | 3B7Ch | 0 | 3E06h | 0 | 7858h |
| 1 | 1C93h | 1 | 7C0Dh | 0 | 5616h |
| 0 | 3926h | 0 | 5EBCh | 1 | 0A8Bh |
| 1 | 1827h | 1 | 1BDFh | 1 | 1517h |
| 0 | 304Eh | 0 | 37BEh | 0 | 2A2Eh |
| 0 | 0AF6h | 0 | 6F7Ch | 0 | 545Ch |
| 0 | 15ECh | 1 | 785Fh | 1 | 0E1Fh |
| 1 | 2BD9h | 1 | 5619h | 1 | 1C3Fh |
| 0 | 3DD8h | 0 | 0A94h | 0 | 387Eh |
| 1 | 11DBh | 0 | 1528h | 0 | 70FCh |
| 0 | 23B6h | 1 | 2A51h | 1 | 475Fh |
| 1 | 2D07h | 1 | 54A3h | 1 | 2819h |
| 0 | 3064h | 0 | 0FE0h | 0 | 5032h |
| 1 | 0AA3h | 0 | 1FC0h | 0 | 06C2h |
| 0 | 1546h | 1 | 3F81h | 0 | 0D84h |
| 1 | 2A8Dh | 1 | 7F03h | 1 | 1B09h |
| 0 | 3F70h | 0 | 58A0h | 0 | 3612h |
| 1 | 148Bh | 0 | 17E6h | 0 | 6C24h |
| 0 | 2916h | 1 | 2FCDh | 1 | 7EEFh |
| 0 | 3846h | 1 | 5F9Bh | 1 | 5B79h |
| 0 | 1AE6h | 0 | 1990h | 0 | 1054h |
| 0 | 35CCh | 1 | 3321h | 1 | 20A9h |
| 1 | 01F2h | 1 | 6643h | 1 | 4153h |
| 1 | 03E5h | 0 | 6A20h | 1 | 2401h |
| 0 | 07CAh | 0 | 72E6h | 0 | 4802h |
| 1 | 0F95h | 0 | 436Ah | 1 | 36A3h |
| 0 | 1F2Ah | 1 | 2073h | 1 | 6D47h |
| 0 | 3E54h | 1 | 40E7h | 1 | 7C29h |
| 1 | 16C2h | 0 | 2768h | 0 | 5EF4h |
| 1 | 2D84h | 1 | 4ED1h | 0 | 1B4Eh |
| 1 | 3163h | 0 | 3B04h | 1 | 369Dh |
| 0 | 08ADh | 1 | 7609h | 0 | 6D3Ah |

| | |
|---|---|
| 0 | 115Ah |
| 1 | 22B5h |
| 0 | 2F00h |
| 1 | 346Bh |
| 0 | 02BCh |
| 1 | 0579h |
| 0 | 0AF2h |
| 0 | 15E4h |
| 0 | 2BC8h |
| 1 | 3DFBh |
| 0 | 119Ch |
| 1 | 2339h |
| 0 | 2C18h |
| 1 | 325Bh |
| 0 | 0EDCh |
| 1 | 1DB9h |

| | |
|---|---|
| 0 | 3B72h |
| 1 | 1C8Fh |
| 0 | 391Eh |
| 0 | 1856h |
| 1 | 30ADh |
| 1 | 0B31h |
| 0 | 1662h |
| 1 | 2CC5h |
| 0 | 33E0h |
| 0 | 0DAAh |
| 1 | 1B55h |
| 0 | 36AAh |
| 0 | 073Eh |
| 0 | 0E7Ch |
| 0 | 1CF8h |
| 0 | 39F0h |

| | |
|---|---|
| 0 | 4AB4h |
| 1 | 33CFh |
| 0 | 679Eh |
| 1 | 699Bh |
| 0 | 7590h |
| 0 | 4D86h |
| 1 | 3DABh |
| 1 | 7B57h |
| 0 | 5008h |
| 0 | 06B6h |
| 1 | 0D6Dh |
| 1 | 1ADBh |
| 0 | 35B6h |
| 0 | 6B6Ch |
| 1 | 707Fh |
| 1 | 4659h |

| | |
|---|---|
| 0 | 2A14h |
| 0 | 5428h |
| 1 | 0EF7h |
| 1 | 1DEFh |
| 0 | 3BDEh |
| 0 | 77BCh |
| 1 | 49DFh |
| 0 | 3518h |
| 0 | 6A30h |
| 0 | 72C6h |
| 1 | 432Bh |
| 1 | 20F1h |
| 0 | 41E2h |
| 0 | 2562h |
| 1 | 4AC5h |
| 1 | 332Dh |

| | |
|---|---|
| 0 | 665Ah |
| 0 | 6A12h |
| 1 | 7283h |
| 1 | 43A1h |
| 0 | 21E4h |
| 1 | 43C9h |
| 0 | 2134h |
| 0 | 4268h |
| 0 | 2276h |
| 0 | 44ECh |
| 1 | 2F7Fh |
| 1 | 5EFFh |
| 0 | 1B58h |
| 0 | 36B0h |
| 0 | 6D60h |
| 1 | 7C67h |

| | |
|---|---|
| 0 | 7CD2h |
| 0 | 5F02h |
| 0 | 18A2h |
| 0 | 3144h |
| 0 | 6288h |
| 0 | 63B6h |
| 0 | 61CAh |
| 1 | 6533h |
| 1 | 6CC1h |
| 1 | 7F25h |
| 1 | 58EDh |
| 1 | 177Dh |
| 1 | 2EFBh |
| 1 | 5DF7h |
| 1 | 1D49h |
| 1 | 3A93h |

FIG. 13B

| | |
|---|---|
| 0 | 5E68h |
| 0 | 1A76h |
| 1 | 34EDh |
| 1 | 69DBh |
| 0 | 7510h |
| 0 | 4C86h |
| 0 | 3FAAh |
| 0 | 7F54h |
| 0 | 580Eh |
| 0 | 16BAh |
| 1 | 2D75h |
| 1 | 5AEBh |
| 1 | 1371h |
| 0 | 26E2h |
| 0 | 4DC4h |
| 1 | 3D2Fh |

PRESERVING CONFIGURATION INFORMATION IN A SCAM BASED SCSI SYSTEM

FIELD OF THE INVENTION

This invention relates to SCSI (Small Computer System Interface) bus systems which are configured using the SCAM (SCSI Configured Automatically) protocol.

BACKGROUND INFORMATION

FIG. 1 (Prior Art) is a simplified diagram of a system employing a SCSI bus. A host adapter 1 is coupled to host 2 via a connector 3. The host 2 comprises a central processing unit (CPU) 3 and a main memory 4. The host adapter 1 may be disposed on a printed circuit board, the host may be disposed on a motherboard, and connector 3 may be a card edge connector so that the host adapter card plugs into the card edge connector of the motherboard. A SCSI bus 5 couples numerous peripheral devices 6–9 (for example, disk drives, printers, CD ROMS and network interface cards) to the host adapter 1. Because each peripheral is manufactured with its own unique original SCSI identification string, the host adapter should be able to uniquely access an individual peripheral using the peripheral's SCSI identification string.

Using the SCAM (SCSI Configured Automatically) protocol, the host adapter can isolate the individual peripheral having the largest original SCSI identification string, read the 32 bytes of the unique original SCSI identification string from the isolated peripheral, assign the peripheral an assigned "SCSI ID" which will be unique on the SCSI bus, store the assigned SCSI ID in random access memory (RAM) 10, then isolate the individual peripheral having the next largest original SCSI identification string, read the 32 bytes of the original SCSI identification string from that isolated peripheral, assign the peripheral a different assigned SCSI ID, store that assigned SCSI ID in RAM 10, and so on until the original SCSI identification strings of all peripherals on the SCSI bus are read and each of the peripherals has been assigned a "SCSI ID" which is unique on the SCSI bus.

FIG. 2 (Prior Art) shows the assigned SCSI IDs ID A, ID B, ID C and ID D of peripherals 6–9 respectively stored in memory locations 11–14 of RAM 10. In the illustrated example, the assigned SCSI ID of the peripheral having the highest original SCSI identification string (peripheral 6) is stored in RAM 10 first, the assigned SCSI ID of the peripheral having the next highest original SCSI identification string (peripheral 7) is stored in RAM 10 next, and so forth. The address location in RAM 10 corresponds with the logical system identifier of the peripheral device. RAM location 13 may, for example, correspond with the disk drive identified with the DOS logical identifier "C", RAM location 14 may correspond with the disk drive identified with the DOS logical identifier "D", and so forth.

If the host adapter is powered down so that the contents of RAM 10 are lost, then the system can redetermine the previously assigned SCSI ID's of the peripherals 6–9 on power up. Provided that no peripherals are removed or added, the correspondence between the memory locations in RAM 10 and the peripherals will be identical. Logical device "C" will therefore remain logical device "C" after power up. If, on the other hand, a disk drive peripheral is added which has, for example, a higher original SCSI identification string than that of peripheral 8 but a lower original SCSI identification string than that of peripheral 7, then the added peripheral will be assigned RAM location 13 and the RAM location of disk drive peripheral 8 will be changed to RAM location 14. Disk drive peripheral 8 will therefore be changed from DOS logical disk drive "C" to DOS logical disk drive "D". This is undesirable.

An automatically configuring SCAM SCSI bus system is therefore desired which will not change the logical identifier of a peripheral connected to the SCSI bus when other peripherals are added or removed from the SCSI bus.

SUMMARY

A peripheral coupled to a SCSI bus is isolated using a SCAM isolation step and a relatively large number (for example, 32 bytes) of original SCSI identification bits is read from the isolated peripheral into a host adapter. The host adapter then generates a relatively small number (for example, 4 bytes) of SCSI identification bits from the relatively large number of original SCSI identification bits. Similarly, each of the other peripherals coupled to the SCSI bus is isolated, its original SCSI identification bits are read, and a relatively small number of SCSI identification bits for that peripheral is generated. The small numbers of SCSI identification bits are stored in a non-volatile memory of the host adapter. The memory location in the non-volatile memory of the SCSI identification bits of a particular peripheral corresponds with the logical system identifier of that peripheral.

If the system is powered down, a peripheral is added, and the system is powered back up, the peripherals are again isolated one by one and the small number of SCSI identification bits for each peripheral is determined. If the SCSI identification bits so determined for a peripheral are present in the non-volatile memory, then the peripheral was present in the system before power down. The SCSI identification bits are therefore not moved in non-volatile memory and the logical system identifier of the peripheral is not changed. In contrast to SCSI identification bits determined for previously existing peripherals, the SCSI identification bits determined for the newly added peripheral are not found in non-volatile memory. These SCSI identification bits are therefore stored in the non-volatile memory at an unused location indicative of the logical system identifier of the newly added peripheral.

To obtain the small number of SCSI identification bits from the large number of original SCSI identification bits (for example, 32 bytes), the first ten bytes of the large number of original SCSI identification bits is considered as the coefficients of a 79 order polynomial. This polynomial is divided by a first predetermined polynomial to obtain a remainder polynomial. The coefficients of the remainder polynomial form two bytes. These two bytes form the first two bytes of the small number of SCSI identification bits.

The bits of the remaining bytes (for example, 22 bytes) of the large number of original SCSI identification bits are considered as the coefficients of a 175 order polynomial. This polynomial is divided by a second predetermined polynomial to obtain a remainder polynomial. The coefficients of this remainder polynomial form two bytes. These two bytes form the next two bytes of the small number of SCSI identification bits (4-bytes).

In the event that the large number of original SCSI identification bits read from two different peripherals result in the same small number of SCSI identification bits (i.e., a collision has occurred), then the first and/or second predetermined polynomials are changed and the determination is repeated until a second small number of SCSI identification bits is determined which is different from the small number of SCSI identification bits determined for every other peripheral coupled to the SCSI bus.

This summary does not purport to define the invention. The invention is defined by the appended claims.

BRIEF DESCRIPTION OF THE DRAWINGS

FIG. 5 sets forth SCAM function codes.

FIGS. 6 and 7 illustrate the bit positions in a SCSI identification string.

FIG. 8 sets forth SCAM transfer cycle conditions.

FIGS. 13A–13B illustrate the operation of a software embodiment implementing an exclusive-OR division technique.

DETAILED DESCRIPTION OF THE PREFERRED EMBODIMENTS

Figure 1:
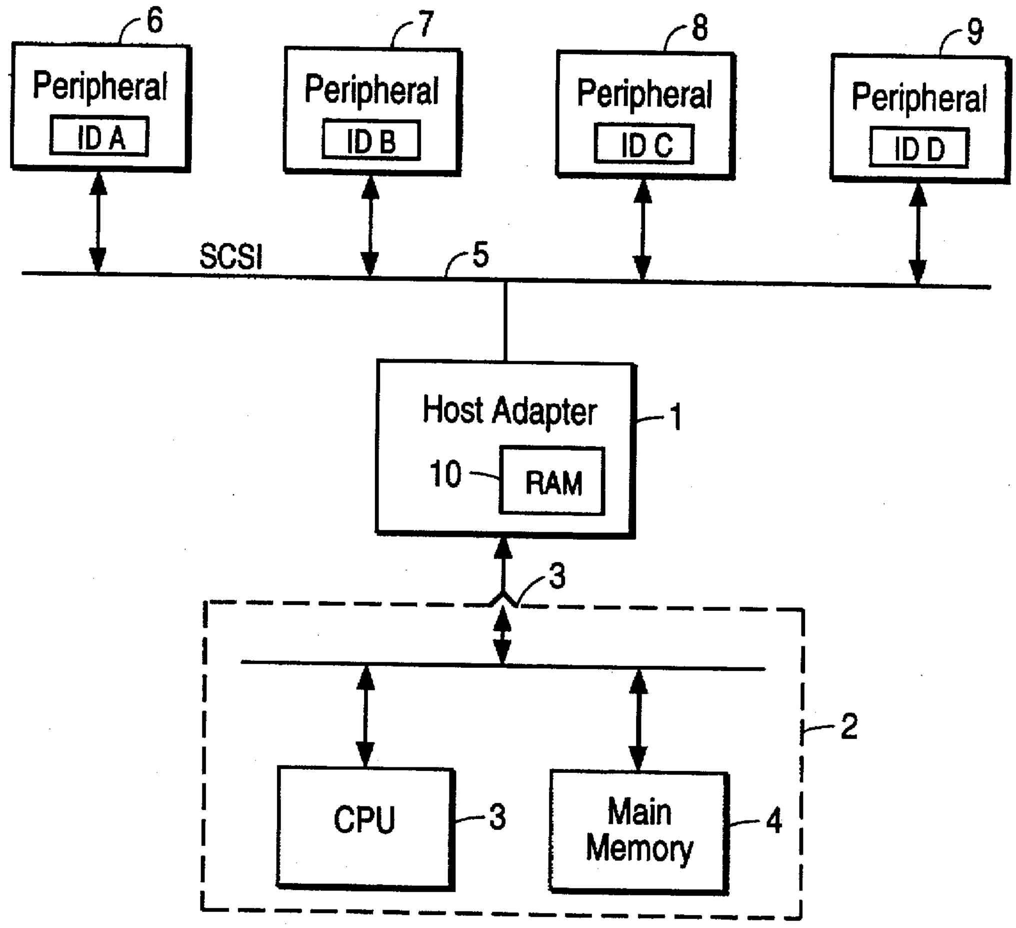
FIG. 1 (Prior Art) is a simplified diagram of a system employing a SCSI bus.
Figure 2:
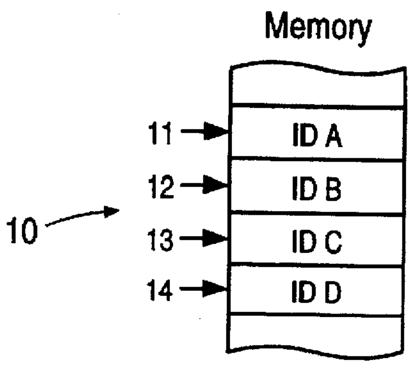
FIG. 2 (Prior Art) illustrates assigned SCSI IDs stored in RAM in the host adapter of FIG. 1.
Figure 3:
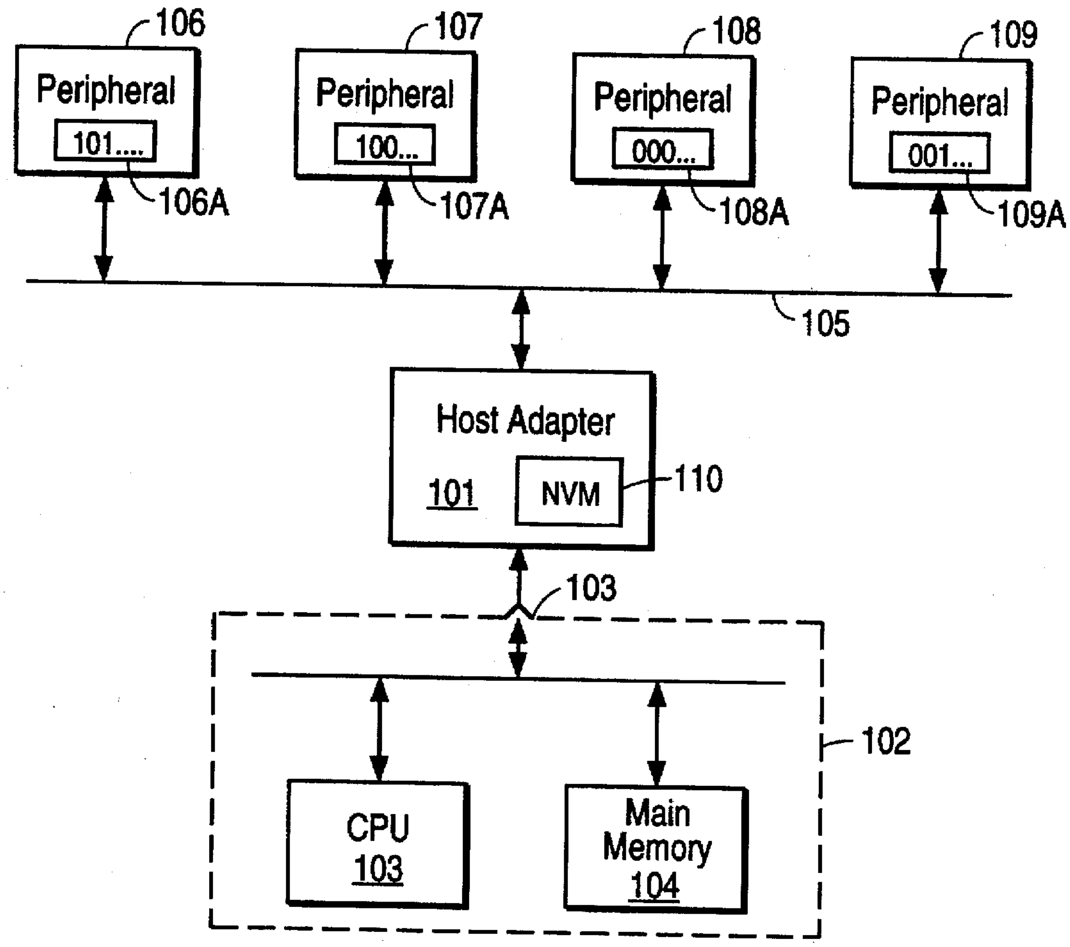
FIG. 3 is a simplified diagram of a SCSI bus system in accordance with the present invention.

FIG. 3 is a simplified diagram of a system in accordance with the present invention. A host adapter 101 is coupled to a host 102 via a connector 103. The host 102 in the illustrated embodiment comprises a central processing unit (CPU) 103 and a main memory 104. The host adapter 101 may be disposed on a printed circuit board, the host may be disposed on a motherboard, and connector 103 may be a card edge connector so that the host adapter card plugs into the card edge connector of the motherboard. A SCSI bus 105 couples numerous peripheral devices 106–109 (for example, disk drives, printers, CD ROMs and network interface cards) to the host adapter 101. Each peripheral is manufactured with its own unique original 32-byte SCSI identification string. (32-bytes is the maximum number of bytes of the SCSI identification string. In some embodiments, the SCSI identification string is less than 32 bytes long.)

Using the SCAM (SCSI configured automatically) protocol set forth in Annex B of the SCSI-3 Parallel Interface Draft ANSI Standard (Document No. X3T10/855D) revision 15a, the host adapter 101 isolates the individual peripheral having the original 32-byte SCSI identification string with the largest value and reads the 32 bytes of the original 32-byte SCSI identification string from the isolated peripheral. In the present illustrative example, peripheral 106 has the original SCSI identification string of largest value. Only the first three bits of the original SCSI identification strings 106A–109A are illustrated in FIG. 3.

Figure 4:
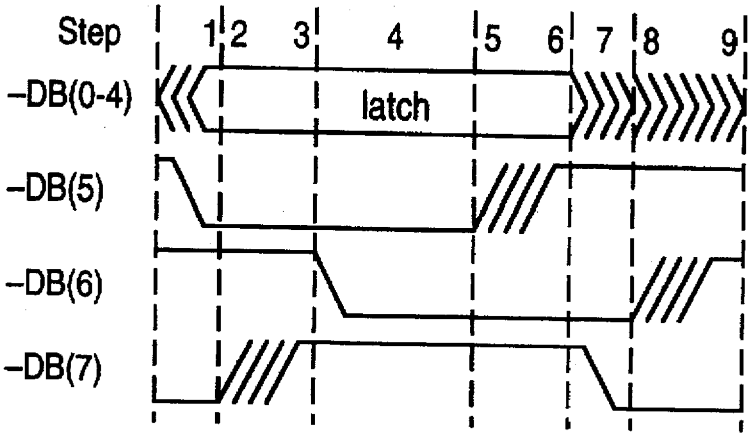
FIG. 4 is a waveform diagram illustrating a SCAM transfer cycle.

To isolate the peripheral having the original SCSI identification string with the largest value, host adapter 101 initiates what is called a SCAM isolate function sequence. A function sequence consists of a series of transfer cycles. FIG. 4 is a waveform diagram illustrating a transfer cycle. In accordance with the SCAM protocol, devices coupled to the SCSI bus 105 assert data in a logical-OR fashion onto bus lines DB(4–0) and assert the bus line DB(5) low as illustrated in FIG. 4 during step 1. All peripherals 106–109 coupled to the SCSI bus read and latch data from the bus lines DB(4–0) at the time in the transfer cycle indicated in FIG. 4 by the dashed line between steps 3 and 4. For additional details on the handshaking signals of a transfer cycle, see Annex B of the SCSI-3 Parallel Interface Draft ANSI Standard (Document No. X3T10/855D) revision 15*a* (the contents of which are incorporated herein by reference).

The first transfer cycle involves host adapter 101 transmitting a synchronization pattern of all "1s" on the data bus lines DB(4–0) of SCSI bus 105. Host adapter 101 in this case is a initiator on the SCSI bus 105 and peripherals 106–109 are targets. The synchronization pattern on the SCSI bus indicates to peripherals 106–109 that a new function sequence is beginning.

The next transfer cycle specifies the function code of the SCAM isolate function sequence. The function code indicates among other things the number of subsequent transfer cycles (if any) that comprise the function sequence. In this case, where the function sequence is the isolate function sequence, the function code is **00000*b* as indicated in FIG. 5. The five bits of the function code are transmitted on data bus lines DB(4–0) by host adapter 101**. For additional details on the other function codes of FIG. 5, see Annex B of the SCSI-3 Parallel Interface Draft ANSI Standard.

Each of the next 16 transfer cycles of the SCAM isolate function sequence involves the transmission of the next successive bit the SCSI identification string stored in each peripheral. FIGS. 6 and 7 illustrate a format of the SCSI identification string stored in each peripheral 106–109. Byte 31 of the SCSI identification string is always FF and is therefore not illustrated in FIG. 6. The first two bytes of the SCSI identification string of FIG. 6 are called a "type code" and are illustrated in further detail in FIG. 7. A 5-bit requested SCSI ID (requested by the peripheral) is contained in bits 4 through 0 of byte 1 of the SCSI identification string. In the first transfer cycle, all the peripherals 106–109 coupled to the SCSI bus 105 transmit their most significant bit of their respective SCSI identification strings onto data lines DB(4–0) in the time period indicated by the dashed line between steps 3 and 4 in FIG. 4.

FIG. 8 illustrates how each peripheral attempts to drive the bus lines DB(4–0) for a bit value of "0" and for a bit value of "1". In the example illustrated, peripheral 106 has the SCSI identification string "101 . . . " of largest value, peripheral 107 has the next largest SCSI identification string "100 . . . ", peripheral 109 has the next largest SCSI identification string "001 . . . ", and peripheral 108 has the lowest original SCSI identification string "000 . . . ". Accordingly, in the first transfer cycle in which the most significant bit of the peripherals' original SCSI identification strings are transmitted onto SCSI bus 105, peripheral 106 asserts onto data bus lines DB(4–0) the value **00010*b* as illustrated in FIG. 8. Because the most significant bit of peripheral 107 is also a "1", peripheral 107 asserts the same value 00010*b* onto the data lines of SCSI bus 105. Peripherals 108 and 109, on the other hand, have a "0" for their most significant bits and therefore assert onto data lines DB(4–0) the value 00001*b* as illustrated in FIG. 8. Because the data lines DB(4–0) are driven in wire-OR fashion, the value 00011*b* is present on the data lines DB(4–0). Peripherals 108 and 109 therefore read the DB(4–0) lines and recognize that a peripheral having a larger SCSI identification string value has driven the data lines of the SCSI bus. As indicated in FIG. 8, peripherals 108 and 109 latch a value of 00011*b*** and therefore "defer" by not participating in further transfer cycles of the SCAM isolate function sequence.

With only peripherals 106 and 107 participating in the next transfer cycle, peripherals 106 and 107 transmit their next most significant bits onto the data bus lines. The next most significant bit in peripheral 106 is a "0" and the next most significant bit in peripheral 107 is a "0". Accordingly both peripherals 106 and 107 output the value 00001*b* onto the data lines DB(4–0) as illustrated in FIG. 8. Because neither peripheral 106 nor 107 has a digital value "1" for the bit of the SCSI identification strings being transmitted during this transfer cycle, data line DB(1) is not asserted as a "1" in wire-OR fashion. Accordingly both peripherals 106 and 107 read the value 00001*b* from data lines DB(4–0) in this transfer cycle and continue to participate in the subsequent transfer cycle as illustrated in FIG. 8.

In the next transfer cycle, peripheral 106 asserts the value 00010*b* onto data lines DB(4–0) because the next bit in its SCSI identification string is a "1". Peripheral 107, on the other hand, asserts a value 00001*b* onto data lines DB(4–0) because its next bit is a "0". Peripheral 107 therefore reads a value 00011*b* on data lines DB(4–0), detects that a peripheral having a larger value SCSI identification string is present on SCSI bus 105, and "defers" from subsequent transfer cycles as indicated in FIG. 8.

This process of transmitting the SCSI identification string bit by bit continues until all the bits of the 32 bytes of the SCSI identification string are transmitted. After all these bits have been transmitted, only the one peripheral having the highest SCSI identification string is still participating. This peripheral is said to have been "isolated".

Figures 9, 11:
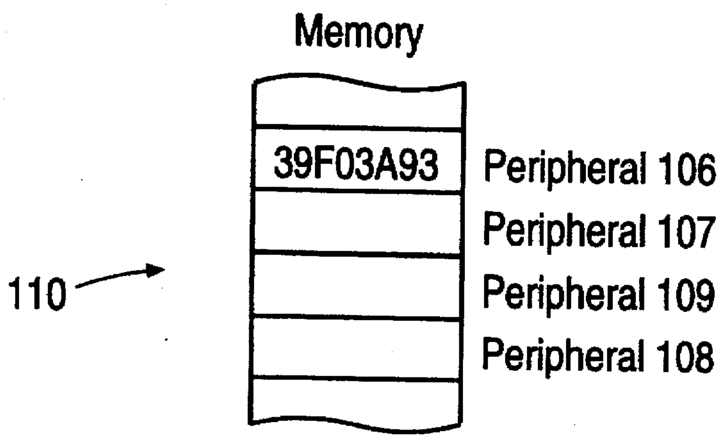
FIG. 9 sets forth SCAM action codes.
FIG. 11 illustrates how hashed down 4-byte values are stored in non-volatile memory of a host adapter in accordance with an embodiment of the present invention.

The next two transfer cycles of the function sequence involve the host adapter 101 broadcasting what is called an "action code" to assign a 5-bit "SCSI ID" (4 bits plus one parity bit) to the isolated peripheral 106. FIG. 9 illustrates the value asserted onto the data lines DB(4–0) during the first transfer cycle (the "first quintet") and the value asserted onto the data line DB(4–0) during the second transfer cycle (the "second quintet"). Adapter 101 therefore assigns an "assigned SCSI ID" to peripheral 106 using an appropriate pair of action code transfer cycles.

Figure 10:
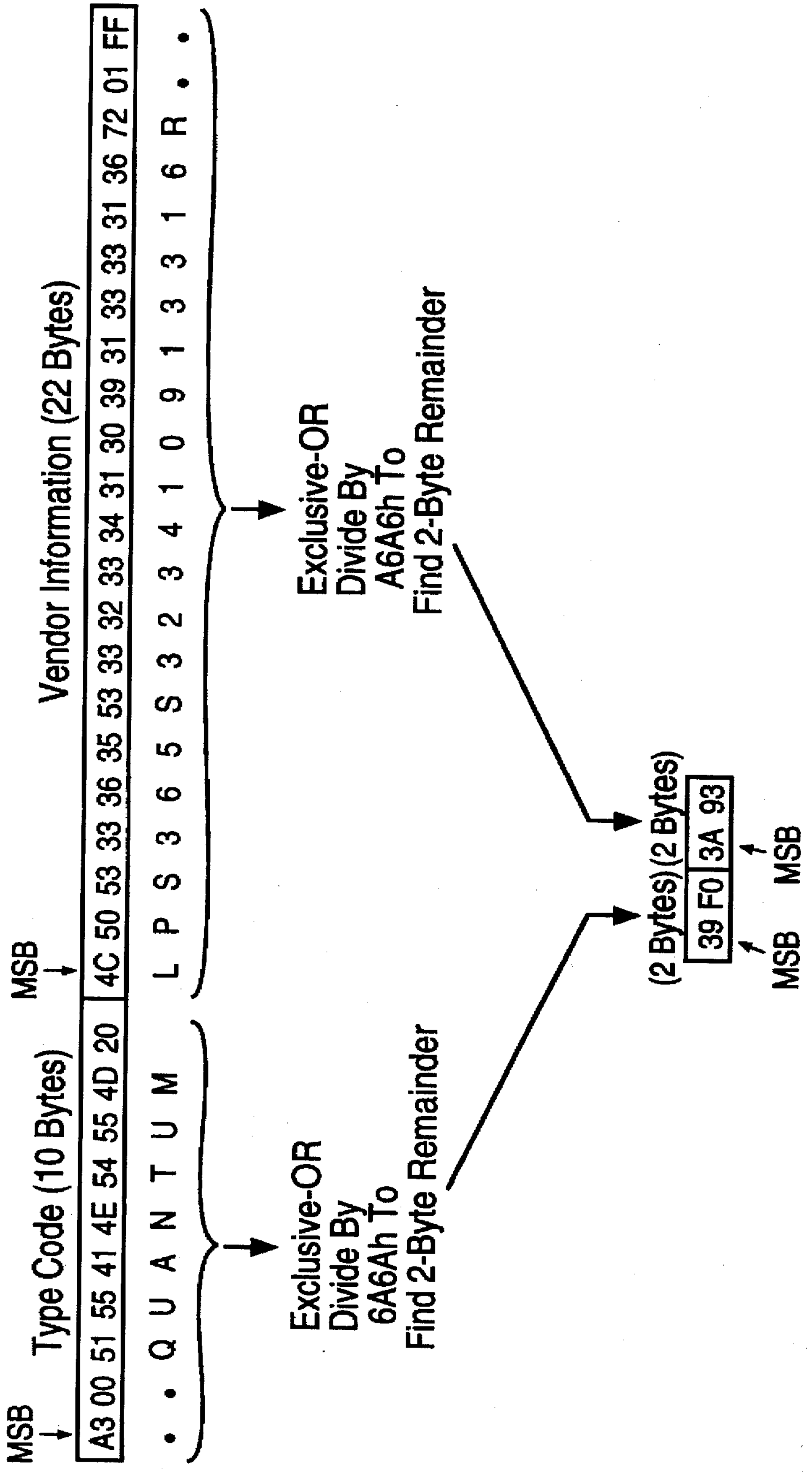
FIG. 10 illustrates generation of a 4-byte hashed down value from a 32-byte SCSI identification string.

In accordance with an embodiment of the present invention, the 32-byte SCSI identification string (see FIG. 6) which is read by host adapter 101 from an isolated peripheral is converted into a 4-byte value for storing in a non-volatile memory 110 of the host adapter 101. FIG. 10 illustrates how one such 32-byte SCSI identification string is converted into a corresponding 4-byte string for storage in non-volatile memory 110.

The first 10 bytes of the SCSI identification string contain a type code and vendor identification information as indicated in FIG. 6. In the example illustrated in FIG. 10, these first 10 bytes spell the word "QUANTUM" indicating that peripheral manufacturer. These first 10 bytes in one embodiment are taken as the coefficients of a 79 order polynomial, the A representing the most significant nibble. Processing circuitry inside host adapter 101 exclusive-OR divides this 79 order polynomial by a first predetermined polynomial to obtain a 2-byte remainder value. In the example illustrated in FIG. 10, the first predetermined polynomial is a 15 order polynomial represented (the individual bits of the value 6A6Ah represent the respective polynomial coefficients). As illustrated in FIG. 10, the resultant remainder polynomial is given by the hexadecimal value 39F0h.

In a similar fashion, the next 22 bytes of the 32 byte SCSI identification string are taken as the respective coefficients of a 175 order polynomial. This 175 order polynomial is exclusive-OR divided by a second predetermined polynomial to obtain a 2-byte remainder value. In the example illustrated in FIG. 10, the second predetermined polynomial is a 15 order polynomial (the respective bits of the hexadecimal value A6A6h represent the polynomial coefficients). The result of the exclusive-OR division is the hexadecimal value 3A93h. Accordingly, it is seen that the 32-byte SCSI identification string is hashed down to a 4-byte value for storage in the non-volatile memory 110 of host adapter 101.

This 4-byte value is compared with the contents of non-volatile memory 110 to make sure that the 4-byte value is not already present in the nonvolatile memory 110. Assuming that the 4-byte value is not present, then the 4-byte value is written into an unused memory location in the nonvolatile memory. (An unused location may contain either no SCSI ID or a SCSI ID of a peripheral no longer on the bus.) A next SCAM isolate function sequence is then performed to read the SCSI identification string of the peripheral having the SCSI identification string of next highest value, this SCSI identification string is hashed down to a 4-byte value, the contents of non-volatile memory is checked to make sure the 4-byte value is not already stored, and if the 4-byte value is not already stored then the 4-byte value is stored in an unused memory location in nonvolatile memory 110. After each successive peripheral is isolated, host adapter 101 "assigns" an "assigned SCSI ID" to that peripheral. Once a peripheral has an assigned SCSI ID on the bus, it does not respond to the SCAM isolation function sequences thereby enabling isolation of peripherals having SCSI identification strings of smaller value.

In accordance with an embodiment of the present invention, the address location in nonvolatile memory 110 at which the hashed down 4-byte value of a peripheral is found indicates the logical system identifier of the peripheral. For the simplified representations of original SCSI identification strings illustrated in FIG. 3, successive memory locations in nonvolatile memory 110 store the hashed down values for peripherals 106, 107, 109 and 108, respectively, as shown in FIG. 11. If, for example, peripherals 106–109 all represent disk drives, then disk drive 106 could be logical DOS disk drive A as indicated by the lowest used memory address location in nonvolatile memory, disk drive 107 could be logical DOS disk drive B as indicated by the next highest used memory address location in nonvolatile memory, disk drive 108 could be logical DOS disk drive C as indicated by the next highest used memory address location in nonvolatile memory, and disk drive 109 could be logical DOS drive D as indicated by the next highest used memory address location in nonvolatile memory. If, for example, peripheral 107 were removed from the system of FIG. 3, then the logical system identifiers of peripherals 108 and 109 would not change. Although the SCSI identification strings of peripherals 108 and 109 have smaller values than does the SCSI identification string of peripheral 107 which is removed, the SCSI identification string of peripherals 108 and 109 are hashed down to unique 4-byte values which were previously stored in nonvolatile memory 110. As the system is powered up after peripheral 107 is removed, peripheral 106 is isolated, its hashed down 4-byte value is determined, and its hashed down 4-byte value is found in nonvolatile memory 110. The logical system identifier of peripheral 106 (DOS disk A) therefore remains the same because the nonvolatile memory address of the hashed down 4-byte value is not changed. Next, peripheral 109 which has the SCSI identification string with the next highest value is isolated. After the hashed down 4-byte value for peripheral 109 is determined, the 4-byte value is found in nonvolatile memory 110 at the same memory location where it appeared before peripheral 107 was removed. Accordingly, the logical system identifier for peripheral 109 (DOS disk C) is not changed. Next, the peripheral 108 is isolated, its 4-byte hashed down value is determined, and its hashed down 4-byte value is found in nonvolatile memory 110 at the same location it was located prior to peripheral 107 being removed. Again, the logical system identifier of peripheral 108 (DOS disk D) is not changed even though peripheral 107 has been removed from the system. Host adapter 101, however, fails to isolate peripheral 107. Accordingly the memory location in nonvolatile memory corresponding to the hashed down value for peripheral 107 is deemed to be unused.

It is possible that the SCSI identification strings read from two different peripherals will hash down to the same 4-byte value. Host adapter 101 therefore checks to see that a prior peripheral had the same 4-byte hashed down value as the present peripheral, the hashed down 4-byte value of which is presently being determined. If host adapter 101 determines that the presently isolated peripheral has the same 4-byte hashed down value (i.e., a "collision") as a previously isolated peripheral on the SCSI bus at that time, then host adapter 101 utilizes a different first polynomial to determine the first 2-byte of the hashed down value and will use a different second polynomial to find the second two-byte value of the hashed down 4-byte value. Most likely this second hashed down 4-byte value will not be identical to a hashed down 4-byte value of another peripheral. In the event there is yet another collision, the host adapter can utilize yet other first and second polynomials. Host adapter 101 may therefore contain a table of alternate first and second polynomials for use in the event of collisions. If there is not a collision, the 4-byte value is stored into the non-volatile memory at an unused location.

Figure 12:
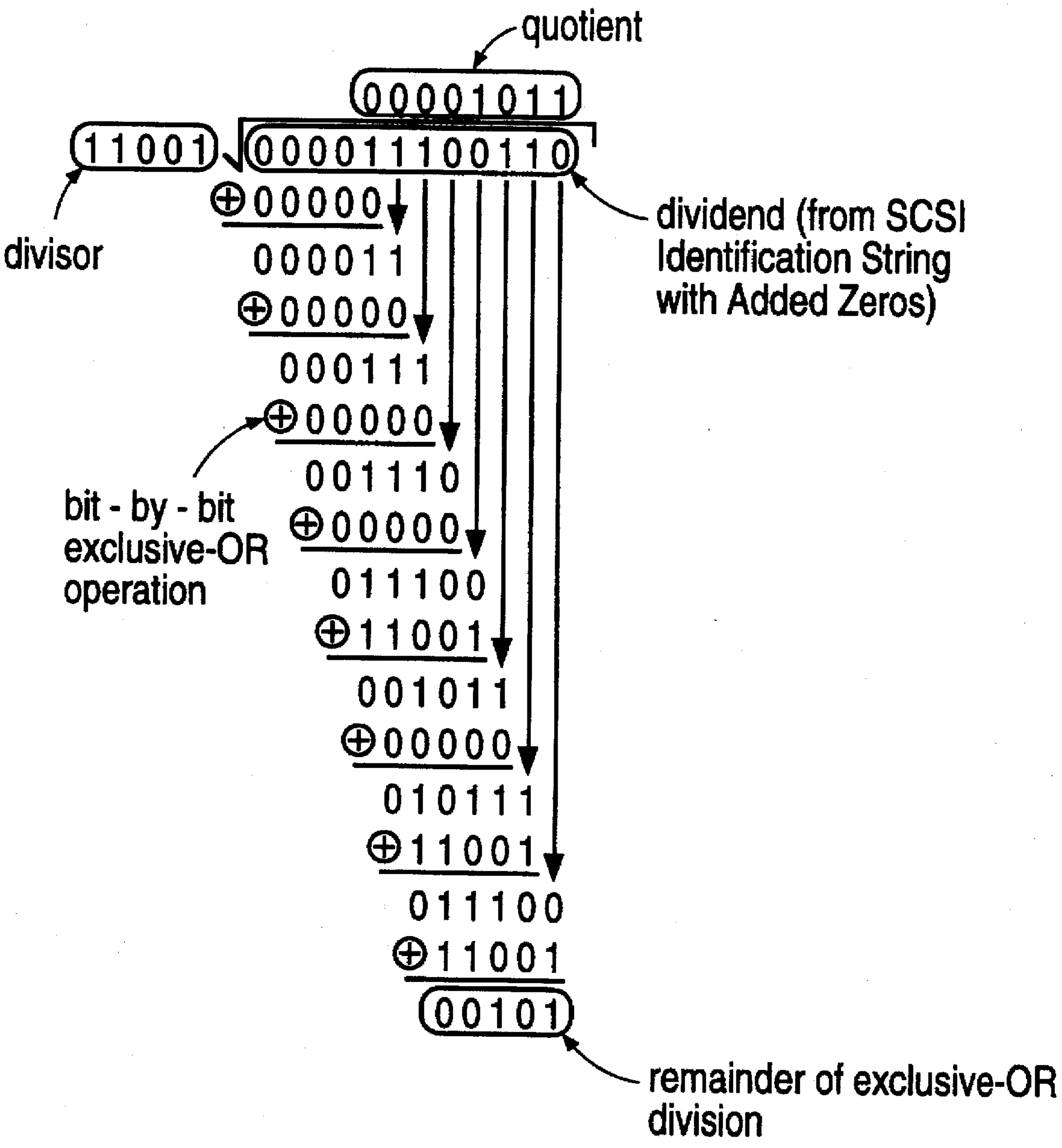
FIG. 12 illustrates an exclusive-OR division technique for generating a hashed down value.

FIG. 12 illustrates an exclusive-OR polynomial division technique for obtaining a 2-byte remainder value in accordance with an embodiment of the present invention. The method is similar to ordinary binary division except that rather than subtracting before each successive carry down, a bit-by-bit exclusive-OR operation is performed before each successive carry down. If implemented to hash the 10-byte type code of the example of FIG. 10, the 80 bits of the 10-byte type code would form the "dividend" and the 16 coefficient bits of the 6A6Ah polynomial would form the "divisor". Four leading zeros are appended to the bits of the SCSI identification string to form the dividend to facilitate bit-by-bit processing. The "remainder" would form the first two bytes of the hashed down 4-byte value.

Figures 13, 13C:
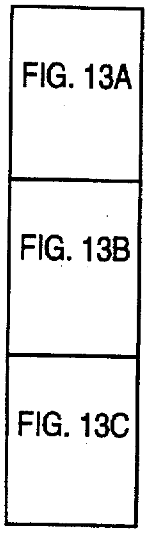
FIG. 13 is a key to FIGS. 13A–13B.

FIG. 13 illustrates steps in the execution of a software implementation of the exclusive-OR polynomial division technique of FIG. 12. Bits of the SCSI identification string are received bit by bit. The 16-bit hexadecimal value on the right in each row is the remainder after the bit on the left has been processed in accordance with the exclusive-OR division processing shown in FIG. 12. The leftmost column illustrates processing of the first 10 bytes of the SCSI identification string and the other two columns illustrate processing of the following 22 bytes of the SCSI identification string.

Although the present invention is described in connection with certain specific embodiments for instructional purposes, the present invention is not limited thereto. It is to be understood that numerous methods for hashing down SCSI identification string bits can be used and that the disclosed method is not limited to division or to an exclusive-OR type division. The hashing can be performed in either hardware or in software. A CRC-type feedback circuit can be used to generate bits for storing in a non-volatile memory of a host adapter. The SCSI identification string can be broken into more than two pieces for hashing. Accordingly, various modifications, adaptations, and combinations of various features of the described embodiments can be practiced without departing from the scope of the invention as set forth in the following claims.

What is claimed is:

1. A method for preventing a logical system identifier from being changed if a device is decoupled from a SCSI bus, comprising:

in a first isolating step, isolating a first device coupled to said SCSI bus;

transferring a first plurality of identification bits from said first device to a second device coupled to said SCSI bus;

from said first plurality of identification bits, obtaining a second plurality of identification bits, there being fewer of said second plurality of identification bits than there are of said first plurality of identification bits; and storing said second plurality of identification bits in a non-volatile memory in said second device.

2. The method of claim 1, further comprising:

in a second isolating step, isolating said first device;

transferring a third plurality of identification bits from said first device to said second device, said third plurality of identification bits being identical to said first plurality of identification bits;

associating said third plurality of identification bits with said second plurality of identification bits to obtain a fourth plurality of identification bits; and transferring said fourth plurality of identification bits from said second device to said first device; and storing said fourth plurality of identification bits in said first device.

3. The method of claim 2, wherein said first isolating step is a SCAM (SCSI Configured Automatically) isolating step.

4. The method of claim 3, wherein said second device issues a SCAM "assign ID" action code onto said SCSI bus to cause said fourth plurality of identification bits to be stored into said first device in said storing said fourth plurality step.

5. The method of claim 1, wherein said second plurality of bits consists of less than 40 bits.

6. The method of claim 2, wherein said associating comprises:

hashing said third plurality of identification bits to obtain a fifth plurality of identification bits; and comparing said first plurality of identification bits and said second plurality of identification bits.

7. A method, comprising;

in a first isolating step, isolating a first device coupled to a SCSI bus;

transferring a first plurality of identification bits from said first device to a second device coupled to said SCSI bus;

from said first plurality of identification bits, obtaining a second plurality of identification bits, there being fewer of said second plurality of identification bits than there are of said first plurality of identification bits; and storing said second plurality of identification bits in a non-volatile memory in said second device, wherein said first plurality of bits comprises a plurality of bits A and another plurality of bits B;

wherein said second plurality of bits comprises a plurality of bits C and another plurality of bits D, and wherein said obtaining step comprises:

using a first method to obtain from said plurality of bits A said plurality of bits C; and using a second method to obtain from said plurality of bits B said plurality of bits D.

8. The method of claim 7, wherein said first method comprises obtaining a remainder R1 using a division operation, said remainder R1 being indicative of said plurality of bits C; and wherein said second method comprises obtaining a remainder R2 using a division operation, said remainder R2 being indicative of said plurality of bits D.

9. The method of claim 8, wherein said division operations are performed in software executed in a processor of a host adapter interface card.

10. The method of claim 7, wherein said plurality of bits A consists of two bytes of bits, said two bytes being the first two bytes of a SCAM identification string received from said first device.

11. A method, comprising:

in a first SCAM isolating step, isolating a first device coupled to a SCSI bus;

transferring a first plurality of identification bits from said first device to a second device coupled to said SCSI bus;

using a first method, obtaining a second plurality of identification bits from said first plurality of identification bits, there being substantially fewer of said second plurality of identification bits than there are of said first plurality of identification bits;

storing said second plurality of identification bits in a non-volatile memory in said second device;

in a second SCAM isolating step, isolating a third device coupled to said SCSI bus;

transferring a third plurality of identification bits from said third device to said second device;

using said first method, obtaining a fourth plurality of identification bits from said third plurality of identification bits, there being substantially fewer of said fourth plurality of identification bits than there are of said third plurality of identification bits; and if said fourth plurality of identification bits is identical to said second plurality of identification bits, using a second method to obtain a fifth plurality of identification bits from said third plurality of bits, there being substantially fewer of said fifth plurality of identification bits than there are of said third plurality of identification bits.

12. The method of claim 11, further comprising:

storing said fifth plurality of identification bits in a non-volatile memory of said second device.

13. The method of claim 12, wherein said first method involves an exclusive-OR division operation, and wherein said second method involves an exclusive-OR division operation.

14. The method of claim 11, wherein said obtaining said second plurality comprises hashing the first plurality of identification bits to obtain the second plurality of identification bits.

15. Host adapter interface circuitry, comprising:

means for receiving a first SCAM identification string from a SCSI bus, said first SCAM identification string comprising a first plurality of bits A and a second plurality of bits B;

means for obtaining a third plurality of bits C from said first plurality of bits A using a first method and for obtaining a fourth plurality of bits D from said second plurality of bits B using a second method; and a non-volatile memory storing said third plurality of bits C and said fourth plurality of bits D.

16. The host adapter interface circuitry of claim 15, further comprising:

a printed circuit board upon which said means for receiving, said means for obtaining and said non-volatile memory is disposed.

17. The host adapter interface circuitry of claim 16, wherein said means for obtaining comprises a digital processor disposed on said printed circuit board.

18. The host adapter interface circuitry of claim 15, wherein said third and fourth pluralities of bits sum to less than 40 bits.

19. The host adapter interface circuitry of claim 15, wherein said non-volatile memory is of a type taken from the group consisting of: EEPROM, flash memory, and battery backed-up SRAM.

20. The host adapter interface circuitry of claim 15, wherein said means for obtaining said third plurality of bits includes means for hashing said first plurality of bits.

21. Host adapter interface circuitry, comprising:

means for receiving a first SCAM identification string from a SCSI bus, said first SCAM identification string comprising a first plurality of bits A and a second plurality of bits B;

means for obtaining a third plurality of bits C from said first plurality of bits A using a first method and for obtaining a fourth plurality of bits D from said second plurality of bits B using a second method; and a non-volatile memory storing said third plurality of bits C and said fourth plurality of bits D;

wherein said means for receiving also receives a second SCAM identification string, said second SCAM identification string comprising a first plurality of bits A and a second plurality of bits B, and wherein said means for obtaining is also for:

using a third method to obtain a fifth plurality of bits E from said first plurality of bits A of said second SCAM identification string if said third plurality of bits C obtained from said first plurality of bits A of said first SCAM identification string using said first method is identical to a third plurality of bits C obtained from said first plurality of bits A of said second SCAM identification string using said first method, said fifth plurality of bits E being different than said third plurality of bits C obtained from said first plurality of bits A of said first SCAM identification string using said first method.

22. Host adapter circuitry, comprising:

a non-volatile memory;

means for hashing a first SCSI identification string from a first peripheral coupled to a SCSI bus down into a first smaller string of bits and for storing the first smaller string of bits in said non-volatile memory, and for hashing a second SCSI identification string from a second peripheral coupled to said SCSI bus down into a second smaller string of bits and for storing the second smaller string of bits in said non-volatile memory; and means for preventing a logical system identifier associated with said first peripheral from being changed if said second peripheral is decoupled from said SCSI bus, and for preventing a logical system identifier associated with said second peripheral from being changed if said first peripheral is decoupled from said SCSI bus.

* * * * *